United States Patent [19]

Müller

[11] Patent Number: 5,752,815
[45] Date of Patent: May 19, 1998

[54] CONTROLLABLE VANE PUMP

[75] Inventor: Toralf Müller, Berlin, Germany

[73] Assignee: Mercedes Benz AG, Stuttgart, Germany

[21] Appl. No.: 816,739

[22] Filed: Jul. 8, 1997

Related U.S. Application Data

[63] Continuation of Ser. No. 699,668, Aug. 19, 1996, abandoned.

[30] Foreign Application Priority Data

Sep. 12, 1995 [DE] Germany ............... 19533686.0

[51] Int. Cl.⁶ .................. F04C 2/344; F04C 15/04
[52] U.S. Cl. .................. 418/26; 418/27; 418/30
[58] Field of Search .................. 418/26, 27, 30

[56] References Cited

U.S. PATENT DOCUMENTS

| | | | |
|---|---|---|---|
| 4,437,819 | 3/1984 | Merz | 418/26 |
| 4,538,974 | 9/1985 | Stich et al. | 418/26 |

FOREIGN PATENT DOCUMENTS

| | | | |
|---|---|---|---|
| 59-147890 | 8/1984 | Japan | 418/30 |
| 6-280754 | 10/1994 | Japan | 418/30 |

Primary Examiner—John J. Vrablik
Attorney, Agent, or Firm—Klaus J. Bach

[57] ABSTRACT

In a controllable vane pump for pumping lubricant through a lubricant circulating system of an internal combustion engine wherein a pivotally supported control ring surrounds the vanes which rotate with the pump rotor and engage the inner walls of the control ring to form therewith pump spaces for pumping an amount of fluid which depends on the pivot position of the control ring and means are provided for biasing the control ring with a certain force toward a pivot position for greatest pump volume, the control ring defines with the housing an inlet pressure chamber which is maintained at the pressure of the lubricant at the pump inlet and a discharge pressure chamber which is maintained at the pump discharge pressure whereby the differential force generated by the pressures in said inlet and discharge pressure chambers is balanced by the force applied to the control ring by the control ring biasing means.

4 Claims, 2 Drawing Sheets

CONTROLLABLE VANE PUMP

This is a Continuation application of Ser. No. 08/699,668 filed 19 Aug. 1996 abandoned.

BACKGROUND OF THE INVENTION

The invention relates to a controllable vane pump for pumping lubricant in a lubricant circulating system of an internal combustion engine.

A vane pump with a variable pumping volume for the lubrication system of an internal combustion engine is described for example in DE 33 33 647 C2. This pump includes a rotor with vanes slidably supported in radial grooves and enclosed by a control ring which is pivotally supported at one side thereof in the pump housing. The pivot position, and consequently, the eccentricity of the control ring with respect to the rotor is adjustable by the pumped lubricant by way of a hydraulic control piston acting on the control ring against the force of a spring which biases the control ring into full volume pumping position while the piston is biased by the pumped lubricant pressure in the opposite direction. The vanes can be radially supported against the control ring by guide rings which are movably arranged in chambers at the opposite side faces of the rotor. A passage interconnects the chambers with the pressure side of the pump. The housing has appropriately arranged lubricant inlet and discharge openings. The pump is designed to provide a lubricant discharge pressure generating a lubricant volume flow which is adapted to the requirements of the lubricating system in which the pump is utilized while the internal control arrangement is simple and reliable.

However, the pump is relatively expensive to manufacture as it comprises a relatively large number of parts because of the design of the pump.

It is the object of the present invention to provide a controllable vane pump for use as a lubricant pump for a lubricant circulating system of an internal combustion engine which has all the advantages of the prior art pump described above but which is simple in design, highly reliable and relatively inexpensive to manufacture.

SUMMARY OF THE INVENTION

In a controllable vane pump for pumping lubricant through a lubricant circulating system of an internal combustion engine wherein a pivotally supported control ring surrounds the vanes which rotate with the pump rotor and engage the inner walls of the control ring to form therewith pump spaces for pumping an amount of lubricant which depends on the pivot position of the control ring and wherein means are provided for biasing the control ring with a certain force toward a pivot position for greatest pump volume, and the control ring defines with the housing an inlet pressure chamber which is maintained at the pressure of the lubricant at the pump inlet and a discharge pressure chamber which is maintained at the pump discharge pressure whereby the differential force generated by the pressures in said inlet and discharge pressure chambers is balanced by the force applied to the control ring by the control ring biasing means. The housing has curved surface sections arranged in spaced relationship from the control ring pivot axis with the control ring pivot axis defining their center of curvature and the control ring has radially projecting seal surface areas which are in contact with the curved surface areas and which define between them the inlet and discharge pressure chambers.

With the arrangement according to the invention the pressure chambers can be provided at any selected location around the control ring; they can be so selected that the resulting force has a certain desirable value. Communication between the pressure chambers around the control ring and the pressure and, respectively, suction sides of the pump may be provided for example simply by recessed areas on the control ring or corresponding recesses in the housing whereby no passages are needed to supply for example the control fluid to a control piston. As the arrangement according to the present invention is very simple and utilizes only few components, it is also highly reliable and inexpensive to manufacture.

The invention will be described below in greater detail on the basis of the accompanying drawings.

DESCRIPTION OF THE PREFERRED EMBODIMENTS

Figure 1:
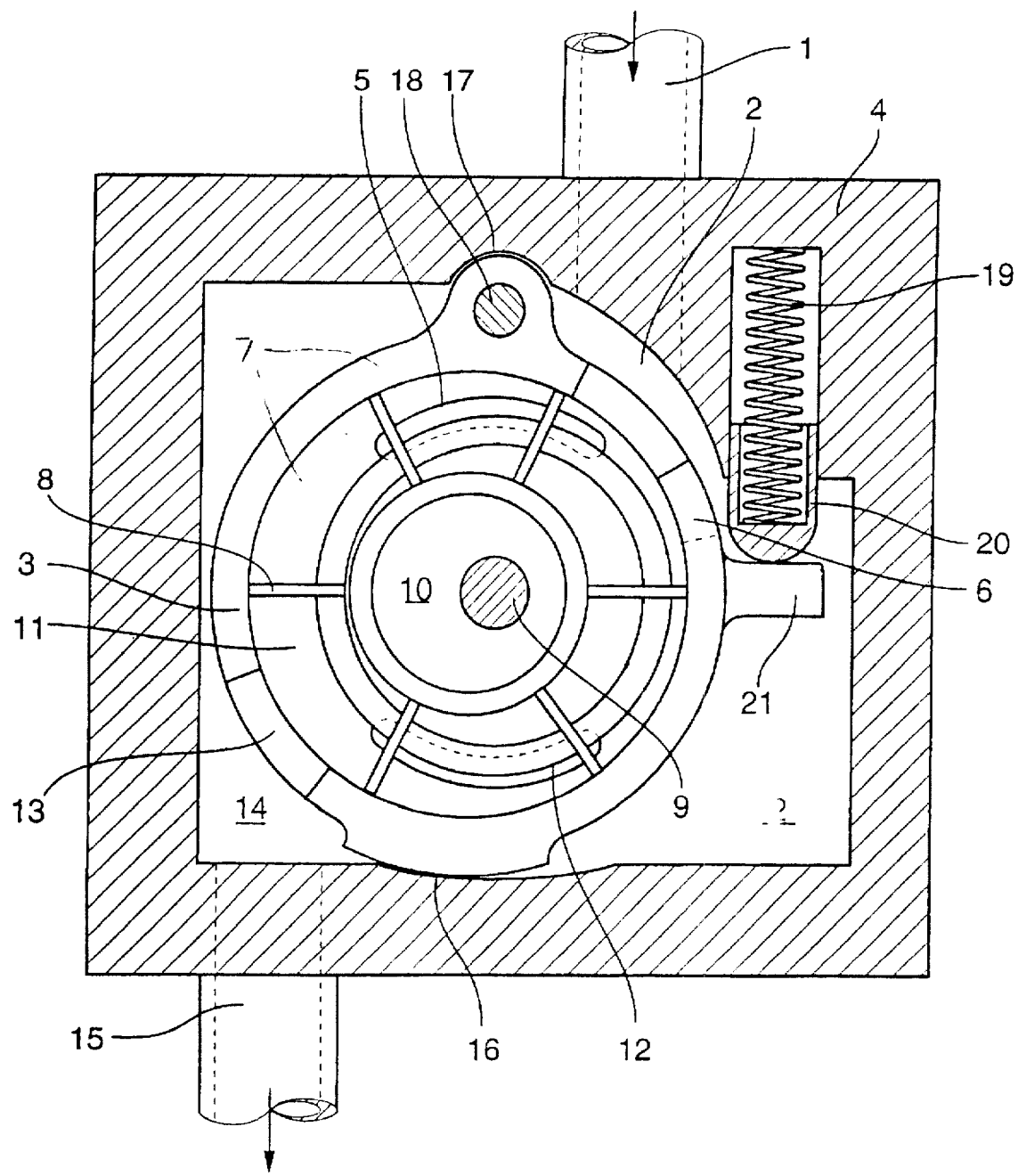
FIG. 1 shows an embodiment of the vane pump according to the invention which includes a pivotally supported control ring whose eccentricity is adjustable to provide for a variable volume flow.

The pump, as shown in FIG. 1, includes a housing 4 with a suction nozzle 1 through which lubricant enters the pump housing 4. A control ring 3 is disposed in the housing 4 so as to provide, at one side of the control ring, an inlet pressure chamber 2 and, at the other side, a discharge pressure chamber 14. The inlet pressure chamber 2 into which the lubricant is conducted from the suction nozzle 1 is in open communication with a lubricant admission recess 5 in the housing 4, through which lubricant enters the pump spaces 7 between the vanes 8. Instead of, or in addition to, the recess 5, the control ring 3 may have appropriately located recessed areas 6 through which lubricant may pass into the pump spaces 7. As is common with the type of pump, the vanes 8 are radially slidably supported by a rotor 10 which is driven by a drive shaft 9 connected to the rotor 10. Upon rotation of the rotor 10, the lubricant is sucked into the pump spaces 7 while they become larger until the pump spaces 7 with the lubricant therein reach the pressure area 11 of the pump. In this area 11, the volumes of the pump spaces between the vanes 8, the rotor 10 and the control ring 3 decrease with further rotation of the rotor. The lubricant is then forced out of the pump spaces by way of the lubricant discharge recess 12 or the recessed areas 13 in the control ring 3 to the discharge pressure chamber 14. From the lubricant discharge recess 12 or from the discharge pressure chamber 14 the lubricant leaves the pump by way of a discharge nozzle 15.

The discharge pressure chamber 14 and the inlet pressure chamber 2 are sealed from one another by sealing surfaces 16 and 17 provided between the control ring 3 and the pump housing 4. During operation of the pump, different pressures develop in the two pressure chambers 2 and 14. Generally, it can be assumed that the pressure in the inlet pressure chamber 2 corresponds to the pump suction pressure and the pressure in the discharge pressure chamber 14 corresponds to the lubricant discharge pressure at the discharge nozzle 15. The pressure difference between the two pressure chambers is utilized to pivot the control ring 3 about a pivot bolt 18 by which the control ring 3 is pivotally supported in the pump housing 4. Pivoting of the control ring 3 results in a change of the eccentricity of the control ring 3 with respect to the rotor 10 and consequently, in a change of the pumping volume. In this manner, the pumping volume is automatically adjusted to the pressure difference between suction and discharge pressures of the pump.

A spring 19 with a spring guide 20 provides for a force to hold the control ring 3 in a predetermined position for a certain pressure difference between the pump suction and discharge pressures. The spring 19 may be located at any point at the circumference of the control ring 3, that is, at any point, a projection 21 may be provided which can be engaged the spring 19 to provide a desired counter moment compensating for the pressure difference. However, the longer the lever arm between the point at which the spring engages the control ring and the pivot point of the control ring is, the smaller the force which is needed by the spring to compensate for the pressure differential force on the control ring. It is also possible in accordance with the invention to use a combination of springs, for example, progressive springs to provide a certain pumping volume depending on the pump pressure and the engine speed in accordance with an engine characteristic diagram.

Figure 2:
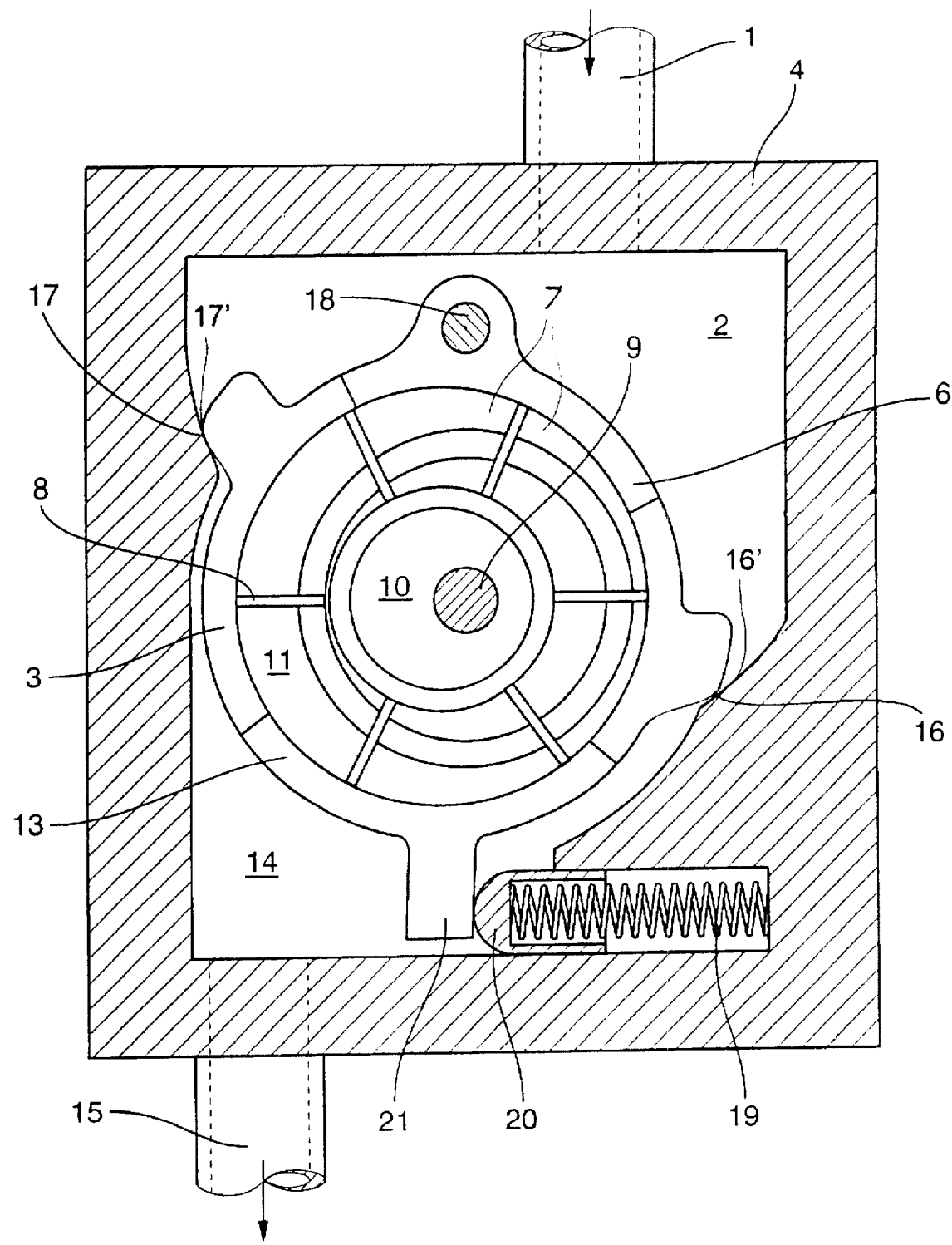
FIG. 2 shows another embodiment of the vane pump according to the invention.

FIG. 2 shows another embodiment of the vane pump according to the invention. The design is in principle the same as that shown in FIG. 1, but in this arrangement, the sealing surfaces 16 and 17 between the pump housing and the control ring 3 are displaced relative to the rotor 10 and the drive shaft 9 such that the spring force required to balance the pressure difference between the inlet pressure chamber 2 and the discharge pressure chamber 14 is reduced. This is achieved by changing the direction in which the fluid pressure force acts on the control ring 3 with respect to the pivot bolt 18 such that the pivot moment of the control ring 3 about its pivot axis is reduced and accordingly the force required to counteract the pivot moment is reduced.

To provide appropriate sealing at the seal surfaces 16 and 17, the pump housing 4 has, adjacent the seal faces 16 and 17 of the control ring 3, curved areas 16' and 17', whose center of curvature is the pivot axis of the control ring 3, that is, the center of the bolt 18. Then the seal surfaces 16 and 17 of the control ring 3 remain in sealing contact with the curved areas 16' and 17' of the housing when the control ring pivots about the bolt 18.

Also, the lubricant admission recess 5 and the lubrication discharge recess 12 of FIG. 1 have been omitted in FIG. 2, since the suction nozzle 1 and the discharge nozzle 15 are in direct communication with the inlet pressure chamber 2 and the discharge pressure chamber 14, respectively. The lubricant to be pumped then enters the pump spaces from the pressure chamber 2 through the recessed area 6 in the control ring 3 and is discharged into the discharge pressure chamber 14 through the recessed area 13 in the control ring 3 if the lubricant flow is in the direction as indicated by the arrows.

What is claimed is:

1. A controllable vane pump for pumping lubricant through a lubricant circulating system of an internal combustion engine comprising: a housing, a rotor disposed in said housing and having a drive shaft for rotating said rotor, a plurality of vanes movably mounted on said rotor, a control ring disposed within said housing so as to be pivotable in said housing about a pivot axis for adjustment of its eccentricity with respect to said rotor, said control ring surrounding said vanes and forming therewith pump spaces of varying sizes depending on the pivot position of said control ring, said housing having means including a spring for biasing said control ring toward a pivot position for greatest pump volume, said housing having curved surface sections arranged in spaced relationship from said pivot axis at opposite sides of a plane extending through the pivot axis of said control ring and the axis of said pump rotor and having a center of curvature coinciding with said control ring pivot axis and said control ring having radially projecting seal surface areas in contact with said curved surface sections of said housing and defining with said housing an inlet pressure chamber at one side and a discharge pressure chamber at the opposite side with sealing surfaces disposed therebetween such that the inlet and discharge pressure chambers are sealed with respect to one another, and said inlet pressure chamber being in communication with said pump spaces in an area of increasing volume and said discharge pressure chamber being in communication with said pump spaces in an area of decreasing volume such that the outer surface of said control ring is exposed at one side to the pump suction pressure in said inlet pressure chamber and at the opposite side to the discharge pressure in said discharge pressure chamber whereby the difference in pressure between said inlet pressure chamber and said discharge pressure chamber is balanced by the force applied to said control ring by said means for biasing said control ring.

2. A vane pump according to claim 1, wherein said sealing surfaces are arranged on said control ring at opposite locations.

3. A vane pump according to claim 1, wherein said means for biasing said control ring toward a pivot position for greatest pump volume includes at least one progressive spring.

4. A vane pump according to claim 1, wherein said sealing surfaces are arranged at circumferential locations by which said control ring is divided into two circular segments of different circumferential lengths.

* * * * *